United States Patent
Mullins et al.

(10) Patent No.: US 9,599,825 B1
(45) Date of Patent: Mar. 21, 2017

(54) VISUAL INDICATOR FOR TRANSPARENT DISPLAY ALIGNMENT

(71) Applicant: DAQRI, LLC, Los Angeles, CA (US)

(72) Inventors: Brian Mullins, Sierra Madre, CA (US); Ryan Ries, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 14/870,871

(22) Filed: Sep. 30, 2015

(51) Int. Cl.
*G06F 3/01* (2006.01)
*G02B 27/01* (2006.01)
*G06T 19/00* (2011.01)

(52) U.S. Cl.
CPC ....... *G02B 27/0179* (2013.01); *G02B 27/017* (2013.01); *G06F 3/013* (2013.01); *G06T 19/006* (2013.01); *G02B 2027/0187* (2013.01); *G02B 2027/0198* (2013.01)

(58) Field of Classification Search
None
See application file for complete search history.

(56) References Cited

U.S. PATENT DOCUMENTS

| 8,643,951 B1* | 2/2014 | Wheeler | G06F 3/012 359/630 |
| 2011/0282130 A1* | 11/2011 | Krueger | A61M 21/00 600/27 |
| 2014/0168264 A1* | 6/2014 | Harrison | G02B 27/0176 345/633 |
| 2015/0035744 A1* | 2/2015 | Robbins | G06K 9/00604 345/156 |
| 2015/0068052 A1* | 3/2015 | Krueger | G01C 9/16 33/301 |

OTHER PUBLICATIONS

"International Application Serial No. PCT/US2016/054545, International Search Report mailed Dec. 9, 2016", 3 pgs.
"International Application Serial No. PCT/US2016/054545, Written Opinion mailed Dec. 9, 2016", 3 pgs.

* cited by examiner

*Primary Examiner* — Yingchun He
(74) *Attorney, Agent, or Firm* — Schwegman Lundberg & Woessner, P.A.

(57) ABSTRACT

A head mounted device includes a sensor, a transparent display, and a processor comprising an augmented reality application and an alignment module. The augmented reality application generates a virtual content based on data from the sensor, and displays the virtual content in the transparent display. The alignment module detects an initialization of the augmented reality application and causes a temporary display of an alignment indicator in the transparent display in response to detecting the initialization of the augmented reality application.

16 Claims, 19 Drawing Sheets

VISUAL INDICATOR FOR TRANSPARENT DISPLAY ALIGNMENT

BACKGROUND

The subject matter disclosed herein generally relates to a user interface for an augmented reality device. Specifically, the present disclosure addresses systems and methods for generating and displaying an alignment guide in a transparent display of a head-mounted device.

Head-mounted devices such as eyeglasses can be used to augment a view of the real world to provide the user with additional information about physical objects in the real-world environment. However, transparent displays can be worn incorrectly (e.g., crooked or unleveled) and thus the additional information may be perceived as displayed in an incorrect location. Because the display is transparent, the user may not be able to determine whether the head-mounted device is properly worn and correctly positioned relative to the eyes of the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
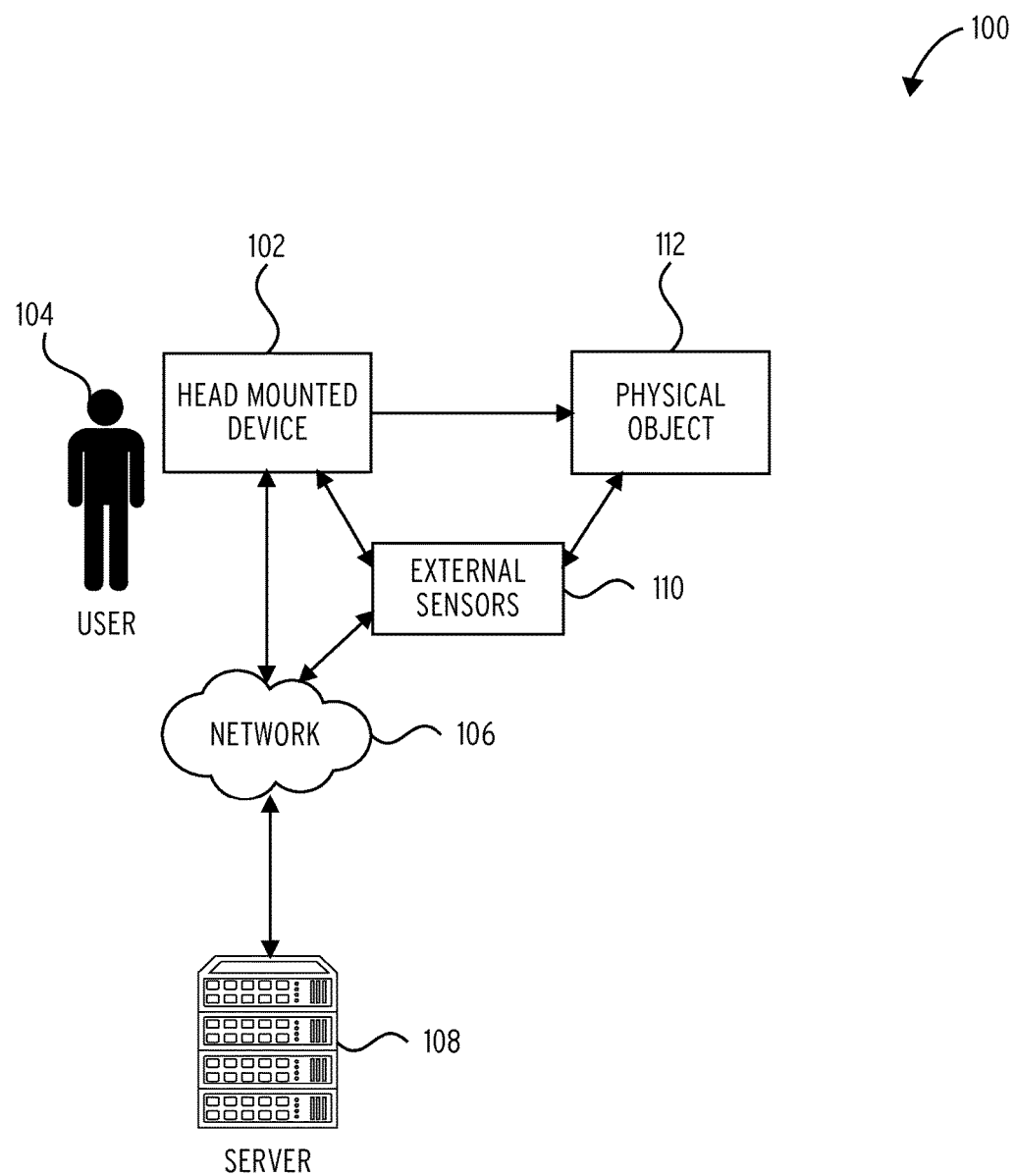
FIG. 1 is a block diagram illustrating an example of a network environment suitable for an augmented reality user interface, according to some example embodiments.

Example methods and systems are directed to a user interface for augmented reality (AR) systems. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a virtual object (e.g., a three-dimensional model of a virtual dinosaur) overlaid on an image of a real-world physical object (e.g., a billboard) captured by a camera of a viewing device. The viewing device may include a handheld device such as a tablet or smartphone, or a wearable device such as a head-mounted device (HMD) (e.g., helmet, glasses). The virtual object may be displayed in a transparent or clear display (e.g., see-through display) of the viewing device. The physical object may include a visual reference (e.g., uniquely identifiable pattern on a physical object) that the AR application can recognize. A visualization of the additional information, such as the virtual object overlaid or engaged with an image of the physical object, is generated in the display of the viewing device. The viewing device generates the virtual object based on the recognized visual reference (e.g., QR code) or captured image of the physical object (e.g., image of a logo). The viewing device displays the virtual object based on a relative position between the viewing device and the visual reference. For example, a virtual dinosaur appears closer and bigger when the viewing device is held closer to the visual reference associated with the virtual dinosaur. Similarly, the virtual dinosaur appears smaller and farther when the viewing device is moved further away from the virtual reference associated with the virtual dinosaur. The virtual object may include a three-dimensional model of a virtual object or a two-dimensional model of a virtual object. For example, the three-dimensional model includes a three-dimensional view of a chair. The two-dimensional model includes a two-dimensional view of a dialog box, menu, or written information such as statistics information for a baseball player. The viewing device renders an image of the three-dimensional or two-dimensional model of the virtual object in the display of the viewing device.

Head-mounted devices with transparent displays can be worn incorrectly (e.g., unlevel) because the display is transparent, the user may not be able to determine the outline of the transparent display and whether the head-mounted device is properly worn and correctly positioned relative to the eyes of the user. The present application describes various visual indicators that can be displayed in the transparent display to guide the user in adjusting the head-mounted device relative to their eyes/head.

The alignment process can be triggered when the user first puts on the head-mounted device or when the user presses a preset button on the head-mounted device. The head-mounted device then generates and displays a visual indicator in the transparent display to help guide the user in adjusting the head-mounted device over their head. For example, the visual indicator includes a static outline of a perimeter of the transparent display (e.g., the sides or border of the transparent display are illuminated, a virtual box corresponding to the borders of the transparent display is displayed). In another example, the visual indicator includes a dynamic virtual object that is displayed in a location in the transparent display based on a relative position between the transparent display and the eyes of the user. For example, the visual indicator may be displayed in a bottom part of the transparent display if the head-mounted device is worn relatively too high on the face of the user. Conversely, the visual indicator may be displayed in a top part of the transparent display if the head-mounted device is worn too low on the face of the user. In addition to its location, the shape, color, and content of the visual indicator may change based on the relative position between the transparent display and the eyes of the user. Eye gaze tracking may also be used to determine the position of the head-mounted device relative to the eyes of the user.

FIG. 1 is a block diagram illustrating an example of a network environment suitable for an augmented reality user interface, according to some example embodiments.

A network environment 100 includes a head-mounted device 102 and a server 108, communicatively coupled to each other via a network 106. The head-mounted device 102 and the server 108 may each be implemented in a computer system, in whole or in part, as described below with respect to FIG. 19.

The server 108 may be part of a network-based system. For example, the network-based system may be or include a cloud-based server system that provides additional information, such as 3D models or other virtual objects, to the head-mounted device 102.

A user 104 may wear the head-mounted device 102 and look at a physical object 112 in a real-world physical environment. The user 104 may be a human user (e.g., a human being), a machine user (e.g., a computer configured by a software program to interact with the head-mounted device 102), or any suitable combination thereof (e.g., a human assisted by a machine or a machine supervised by a human). The user 104 is not part of the network environment 100, but is associated with the head-mounted device 102. For example, the head-mounted device 102 may be a computing device with a camera and a transparent display such as a tablet, smartphone, or a wearable computing device (e.g., helmet or glasses). In another example embodiment, the computing device may be hand held or may be removably mounted to the head of the user 104. In one example, the display may be a screen that displays what is captured with a camera of the head-mounted device 102. In another example, the display of the head-mounted device 102 may be transparent or semi-transparent such as in lenses of wearable computing glasses or the visor or a face shield of a helmet.

The user 104 may be a user of an AR application in the head-mounted device 102 and at the server 108. The AR application may provide the user 104 with an AR experience triggered by identified objects (e.g., physical object 112) in the physical environment. For example, the physical object 112 may include identifiable objects such as a 2D physical object (e.g., a picture), a 3D physical object (e.g., a factory machine), a location (e.g., at the bottom floor of a factory), or any references (e.g., perceived corners of walls or furniture) in the real-world physical environment. The AR application may include computer vision recognition to determine corners, objects, lines, letters, etc.

In one example embodiment, the objects in the image are tracked and recognized locally in the head-mounted device 102 using a local context recognition dataset or any other previously stored dataset of the AR application of the head-mounted device 102. The local context recognition dataset module may include a library of virtual objects associated with real-world physical objects or references. In one example, the head-mounted device 102 identifies feature points in an image of the physical object 112. The head-mounted device 102 may also identify tracking data related to the physical object 112 (e.g., GPS location of the head-mounted device 102, orientation, distance to the physical object 112). If the captured image is not recognized locally at the head-mounted device 102, the head-mounted device 102 can download additional information (e.g., 3D model or other augmented data) corresponding to the captured image, from a database of the server 108 over the network 106.

In another example embodiment, the physical object 112 in the image is tracked and recognized remotely at the server 108 using a remote context recognition dataset or any other previously stored dataset of an AR application in the server 108. The remote context recognition dataset module may include a library of virtual objects or augmented information associated with real-world physical objects or references.

External sensors 110 may be associated with, coupled to, related to the physical object 112 to measure a location, status, and characteristics of the physical object 112. Examples of measured readings may include and but are not limited to weight, pressure, temperature, velocity, direction, position, intrinsic and extrinsic properties, acceleration, and dimensions. For example, external sensors 110 may be disposed throughout a factory floor to measure movement, pressure, orientation, and temperature. The external sensors 110 can also be used to measure a location, status, and characteristics of the head-mounted device 102 and the user 104. The server 108 can compute readings from data generated by the external sensors 110. The server 108 can generate virtual indicators such as vectors or colors based on data from external sensors 110. Virtual indicators are then overlaid on top of a live image or a view of the physical object 112 in a line of sight of the user 104 to show data related to the physical object 112. For example, the virtual indicators may include arrows with shapes and colors that change based on real-time data. The visualization may be provided to the physical object 112 so that the head-mounted device 102 can render the virtual indicators in a display of the head-mounted device 102. In another example embodiment, the virtual indicators are rendered at the server 108 and streamed to the head-mounted device 102.

The external sensors 110 may include other sensors used to track the location, movement, and orientation of the head-mounted device 102 externally without having to rely on sensors internal to the head-mounted device 102. The external sensors 110 may include optical sensors (e.g., depth-enabled 3D camera), wireless sensors (Bluetooth, Wi-Fi), GPS sensors, and audio sensors to determine the location of the user 104 wearing the head-mounted device 102, distance of the user 104 to the external sensors 110 (e.g., sensors placed in corners of a venue or a room), the orientation of the head-mounted device 102 to track what the user 104 is looking at (e.g., direction at which the head-mounted device 102 is pointed, e.g., head-mounted device 102 pointed towards a player on a tennis court, head-mounted device 102 pointed at a person in a room).

In another example embodiment, data from the external sensors 110 and internal sensors in the head-mounted device 102 may be used for analytics data processing at the server 108 (or another server) for analysis on usage and how the user 104 is interacting with the physical object 112 in the physical environment. Live data from other servers may also be used in the analytics data processing. For example, the analytics data may track at what locations (e.g., points or features) on the physical or virtual object the user 104 has looked, how long the user 104 has looked at each location on the physical or virtual object, how the user 104 wore the head-mounted device 102 when looking at the physical or virtual object, which features of the virtual object the user 104 interacted with (e.g., such as whether the user 104 engaged with the virtual object), and any suitable combination thereof. The head-mounted device 102 receives a visualization content dataset related to the analytics data. The head-mounted device 102 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 19. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 106 may be any network that enables communication between or among machines (e.g., server 108), databases, and devices (e.g., head-mounted device 102). Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof.

Figure 2:
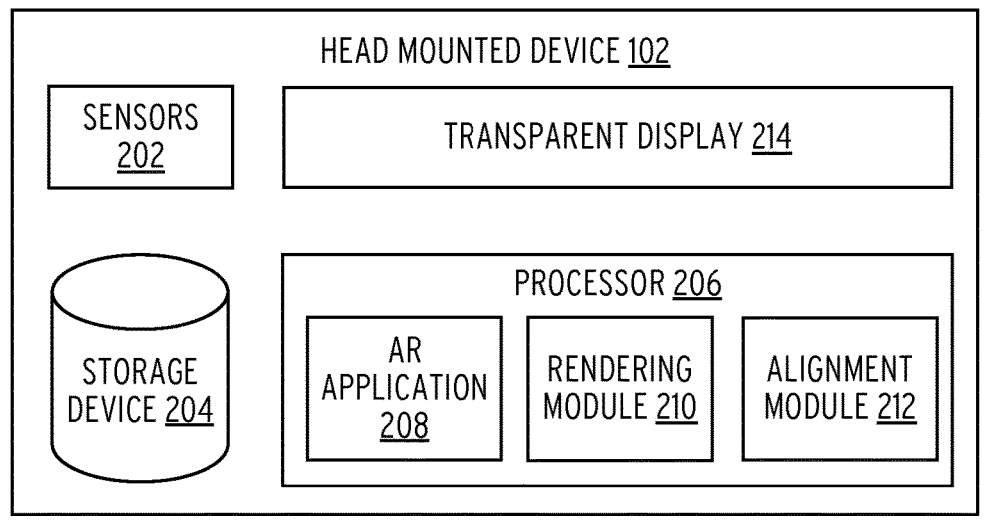
FIG. 2 is a block diagram illustrating an example embodiment of modules (e.g., components) of a head-mounted device.

FIG. 2 is a block diagram illustrating an example embodiment of modules (e.g., components) of a head-mounted device.

The head-mounted device 102 includes sensors 202, a transparent display 214, a processor 206, and a storage device 204. For example, the head-mounted device 102 may include a helmet, a visor, or any other device mounted to the head of the user 104.

The sensors 202 include, for example, a thermometer, an infrared camera, a barometer, a humidity sensor, an EEG sensor, a proximity or location sensor (e.g., near field communication, GPS, Bluetooth, Wi-Fi), an optical sensor (e.g., camera), an orientation sensor (e.g., gyroscope), an audio sensor (e.g., a microphone), or any suitable combination thereof. For example, the sensors 202 may include a rear-facing camera and a front-facing camera in the head-mounted device 102. It is noted that the sensors described herein are for illustration purposes and the sensors 202 are thus not limited to the ones described.

The transparent display 214 includes, for example, a display configured to display images generated by the processor 206. In another example, the transparent display 214 includes a touch sensitive surface to receive a user input via a contact on the touch sensitive surface.

The processor 206 includes an AR application 208, a rendering module 210, and an alignment module 212. The AR application 208 receives data from sensors 202 (e.g., receives an image of the physical object 112) and identifies and recognizes the physical object 112 using machine-vision recognition techniques. The AR application 208 then retrieves from the storage device 204 AR content associated with the physical object 112. In one example embodiment, the AR application 208 identifies a visual reference (e.g., a logo or QR code) on the physical object 112 (e.g., a chair) and tracks the location of the visual reference. The visual reference may also be referred to as a marker and may consist of an identifiable image, symbol, letter, number, machine-readable code. For example, the visual reference may include a bar code, a quick response (QR) code, or an image that has been previously associated with the virtual object.

The rendering module 210 renders virtual objects based on data from sensors 202. For example, the rendering module 210 renders a display of a virtual object (e.g., a door with a color based on the temperature inside the room as detected by sensors from HMDs inside the room) based on a three-dimensional model of the virtual object (e.g., 3D model of a virtual door) associated with the physical object 112 (e.g., a physical door). In another example, the rendering module 210 generates a display of the virtual object overlaid on an image of the physical object 112 captured by a camera of the head-mounted device 102. The virtual object may be further manipulated (e.g., by the user 104) by moving the physical object 112 relative to the head-mounted device 102. Similarly, the display of the virtual object may be manipulated (e.g., by the user 104) by moving the head-mounted device 102 relative to the physical object 112.

In another example embodiment, the rendering module 210 includes a local rendering engine that generates a visualization of a three-dimensional virtual object overlaid on (e.g., superimposed upon, or otherwise displayed in tandem with) an image of the physical object 112 captured by a camera of the head-mounted device 102 or a view of the physical object 112 in the transparent display 214 of the head-mounted device 102. A visualization of the three-dimensional virtual object may be manipulated by adjusting a position of the physical object 112 (e.g., its physical location, orientation, or both) relative to the camera of the head-mounted device 102. Similarly, the visualization of the three-dimensional virtual object may be manipulated by adjusting a position camera of the head-mounted device 102 relative to the physical object 112.

In one example embodiment, the rendering module 210 identifies the physical object 112 (e.g., a physical telephone) based on data from sensors 202 and external sensors 110, accesses virtual functions (e.g., increase or lower the volume of a nearby television) associated with physical manipulations (e.g., lifting a physical telephone handset) of the physical object 112, and generates a virtual function corresponding to a physical manipulation of the physical object 112.

In another example embodiment, the rendering module 210 determines whether the captured image matches an image locally stored in the storage device 204 that includes a local database of images and corresponding additional information (e.g., three-dimensional model and interactive features). The rendering module 210 retrieves a primary content dataset from the server 108, and generates and updates a contextual content dataset based on an image captured with the head-mounted device 102.

The alignment module 212 generates a visual indicator to be displayed in the transparent display 214. The visual indicator helps the user 104 and guides the user to align the head-mounted device 102 when the user 104 first put on or wears the head-mounted device 102 on his/her head. The alignment module 212 may receive data from the sensors 202 to determine a relative position between the transparent display 214 and the eyes of the user 104. The alignment module 212 may then generate and display visual indicators to help guide the user 104 in adjusting a position of the head-mounted device 102.

The storage device 204 stores an identification of the sensors 202 and their respective functions. The storage device 204 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the HMD 102 relative to the picture of the shoe. Features of the three-dimensional virtual shoe may include selectable icons on the three-dimensional virtual model of the shoe. An icon may be selected or activated using a user interface on the HMD 102.

In another example embodiment, the storage device 204 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 108. The core set of images may include a limited number of images identified by the server 108. For example, the core set of images may include the images depicting covers of the ten most popular magazines and their corresponding experiences (e.g., virtual objects that represent the ten most popular magazines). In another example, the server 108 may generate the first set of images based on the most popular or often scanned images received at the server 108. Thus, the primary content dataset does not depend on objects or images scanned by the rendering module 210 of the HMD 102.

The contextual content dataset includes, for example, a second set of images and corresponding experiences (e.g., three-dimensional virtual object models) retrieved from the server 108. For example, images captured with the HMD 102 that are not recognized (e.g., by the server 108) in the primary content dataset are submitted to the server 108 for recognition. If the captured image is recognized by the server 108, a corresponding experience may be downloaded at the HMD 102 and stored in the contextual content dataset. Thus, the contextual content dataset relies on the context in which the HMD 102 has been used. As such, the contextual content dataset depends on objects or images scanned by the rendering module 210 of the HMD 102.

In one embodiment, the HMD 102 may communicate over the network 106 with the server 108 to retrieve a portion of a database of visual references, corresponding three-dimensional virtual objects, and corresponding interactive features of the three-dimensional virtual objects. The network 106 may be any network that enables communication between or among machines, databases, and devices (e.g., the HMD 102). Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
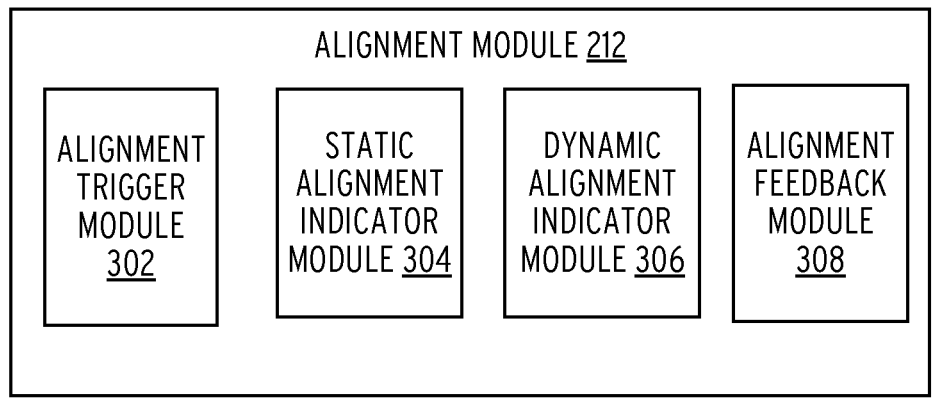
FIG. 3 is a block diagram illustrating an example embodiment of an alignment module.

FIG. 3 is a block diagram illustrating an example embodiment of an alignment module.

The alignment module 212 includes an alignment trigger module 302, a static alignment indicator module 304, a dynamic alignment indicator module 306, and an alignment feedback module 308.

The alignment trigger module 302 determines whether to start or initiate an alignment process. For example, the alignment process may be initiated as soon as the user 104 wears the head-mounted device 102. In another example, the user 104 already wears the head-mounted device 102 and seeks to manually call for the alignment process by pressing on a button in the head-mounted device 102.

The static alignment indicator module 304 generates and displays a visual indicator that has a static position relative to the transparent display 214 regardless of a position or an orientation of the head-mounted device 102. Examples of visual indicators may include an outline of a border of the transparent display 214, an outline of corners of the transparent display 214, a cross-hair in the middle of the transparent display 214, a horizontal line in the middle of the transparent display 214.

The dynamic alignment indicator module 306 generates and displays a visual indicator that has a dynamic position relative to the transparent display 214 based on a position or orientation of the head-mounted device 102 relative to the head or eyes of the user 104. The shape, size, or content of the visual indicator may change based on the position of the transparent display 214 relative to the user 104. In another example, the location of the visual indicator in the transparent display 214 changes based on the position or orientation of the head-mounted device 102 relative to the head or eyes of the user 104.

The alignment feedback module 308 determines whether the transparent display 214 is properly aligned relative to the head or eyes of the user 104. Once the alignment feedback module 308 determines that the head-mounted device 102 is properly aligned, the visual indicator disappears and is removed from the transparent display 214.

Figure 4:
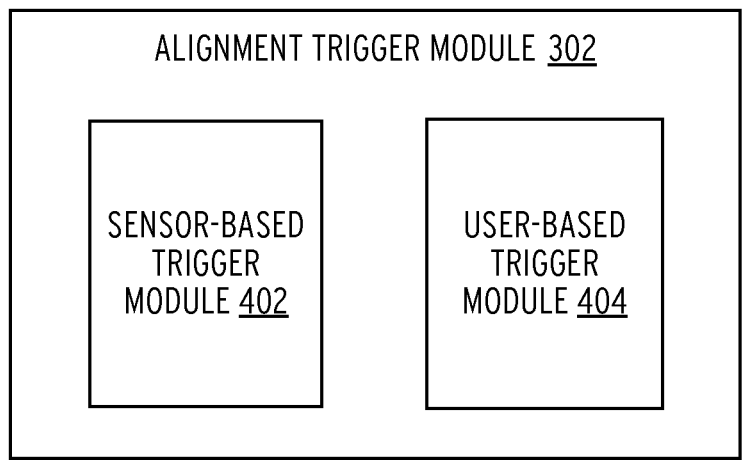
FIG. 4 is a block diagram illustrating an example embodiment of an alignment trigger module.

FIG. 4 is a block diagram illustrating an example embodiment of the alignment trigger module 302. The alignment trigger module 302 includes, for example, a sensor-based trigger module 402 and a user-based trigger module 404. The sensor-based trigger module 402 determines whether the user 104 is first putting on the head-mounted device 102 using sensors 202. The user-based trigger module 404 enables the user 104 to trigger the alignment process by pressing on a button in the head-mounted device 102. Other types of sensors may be used to determine whether the user 104 wishes to initiate the alignment process. For example, the user 104 may tap the top of the head-mounted device 102 to trigger the alignment process of the alignment module 212.

Figure 5:
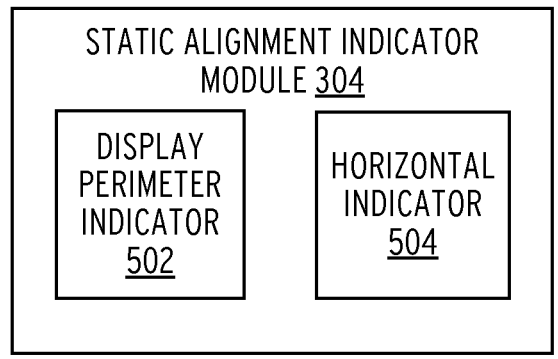
FIG. 5 is a block diagram illustrating an example embodiment of a static alignment indicator module.

FIG. 5 is a block diagram illustrating an example embodiment of the static alignment indicator module 304. The static alignment indicator module 304 includes a display perimeter indicator 502 and a horizontal indicator 504. Static in the present context means that the visual indicator position does not depend on the relative position of the transparent display 214 and the eyes or head of the user 104. The display perimeter indicator 502 generates and displays a visual indicator showing or highlighting the perimeter of the transparent display 214. For example, a contour line may be displayed along the edges of the transparent display 214.

The horizontal indicator 504 generates and displays a horizontal line in the transparent display 214. The horizontal line may be positioned in the middle of the transparent display 214. Therefore, the horizontal line does not change position and is static relative to the transparent display 214. Other examples of static horizontal indicators include a cross-hair, or corners. The user 104 may perceive a horizontal line overlaid in the real world based on the horizontal line in the transparent display 214. In another example, the user 104 may perceive a large rectangular frame overlaid on the real world based on a highlighted perimeter from the transparent display 214.

Figure 6:
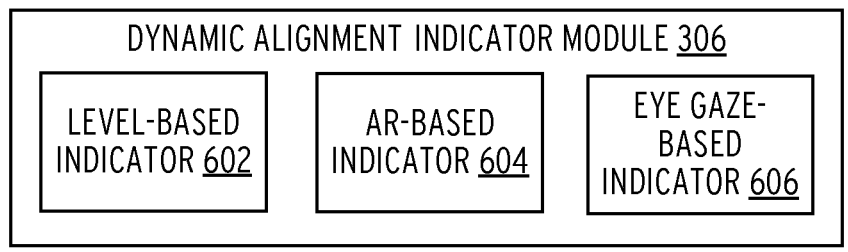
FIG. 6 is diagram illustrating an example embodiment of dynamic alignment indicator module.

FIG. 6 is diagram illustrating an example embodiment of the dynamic alignment indicator module 306. The dynamic alignment indicator module 306 includes a level-based indicator 602, an AR-based indicator 604, and an eye gaze-based indicator 606.

The level-based indicator 602 generates and displays a virtual horizon in the transparent display 214. The virtual horizon may show a line to indicate whether the transparent display 214 is tilted to the right or left. The level-based indicator 602 may use an accelerometer to determine a level or position of the head-mounted device 102.

The level-based indicator 602 may further generate and display the virtual horizon in conjunction with the static horizontal line generated by the horizontal indicator 504 to guide the user 104 and show whether the transparent display 214 is level.

The AR-based indicator 604 generates and displays a virtual object that guides the user 104 in aligning the head-mounted device 102. For example, the virtual object may include virtual arrows or a virtual character pointing in a particular direction for the user 104 to adjust his/her head-mounted device 102.

In one example embodiment, the position and location of the AR-based indicator 604 may depend and be based on the comparison of the virtual horizon and an orientation of the head-mounted device 102. In another example embodiment, the position and location of the AR-based indicator 604 may depend and be based on the relative position of the transparent display 214 and the eyes of the user 104.

The eye gaze-based indicator 606 may track an eye gaze of the user 104. For example, the eye gaze-based indicator 606 uses a camera aimed at the eye of the user 104 to track a position and a movement of the pupil relative to the eye of the user 104 to determine the eye gaze of the user 104. The eye gaze-based indicator 606 can determine at where in the transparent display 214 and for how long the user 104 has looked. For example, the eye gaze-based indicator 606 determines whether the user 104 looks upward or downward. The eye gaze-based indicator 606 can use the eye gaze tracking data to determine a position of the eye relative to the transparent display 214 and generate a display of a visual alignment guide based on the eye gaze tracking data.

Furthermore, the eye gaze-based indicator 606 can track the eye gaze and generate an eye gaze pattern based on the movement of the pupil of the eyes of the user 104. The eye gaze-based indicator 606 can measure the speed at which the eyes of the user 104 move when the user 104 looks through the transparent display 214. For example, the eye gaze-based indicator 606 measures how fast the user 104 is looking upward or downward by measuring how fast the eyes of the user 104 move up or down.

Figure 7:
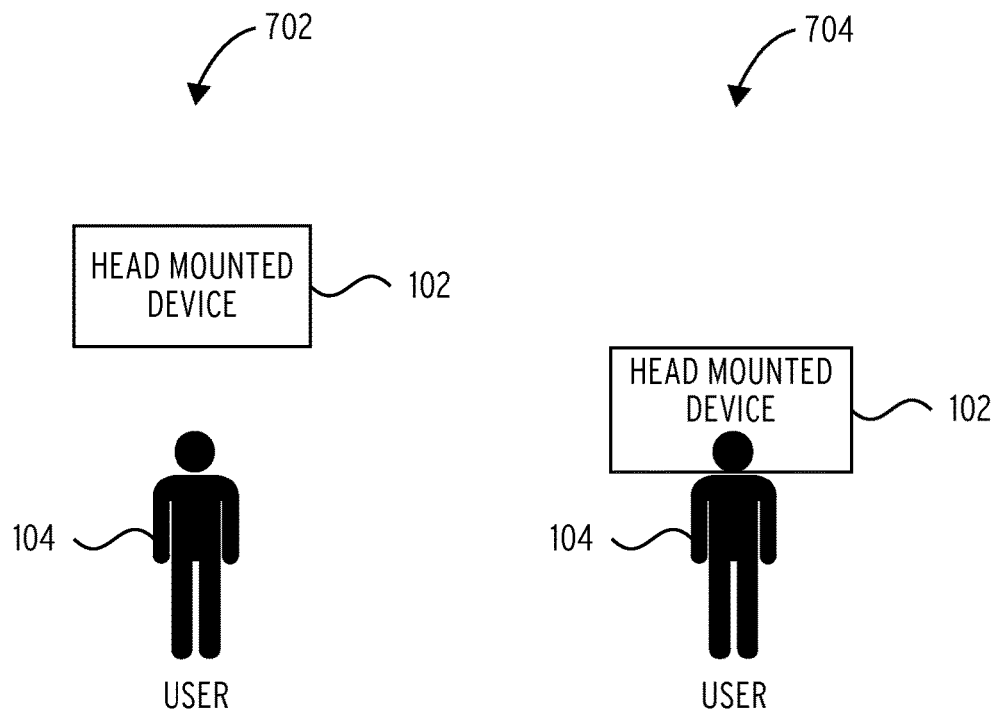
FIG. 7 is a diagram illustrating an example of operation of detecting a user wearing a head-mounted device.

FIG. 7 is a diagram illustrating an example of operation of detecting a user wearing a head-mounted device. In position 702, the user 104 is not yet wearing the head-mounted device 102. In position 704, the user 104 wears the head-mounted device 102 and the alignment module 212 triggers the alignment process. In another example, the alignment process is triggered when the AR application 208 in the head-mounted device 102 is initialized or started.

Figure 8:
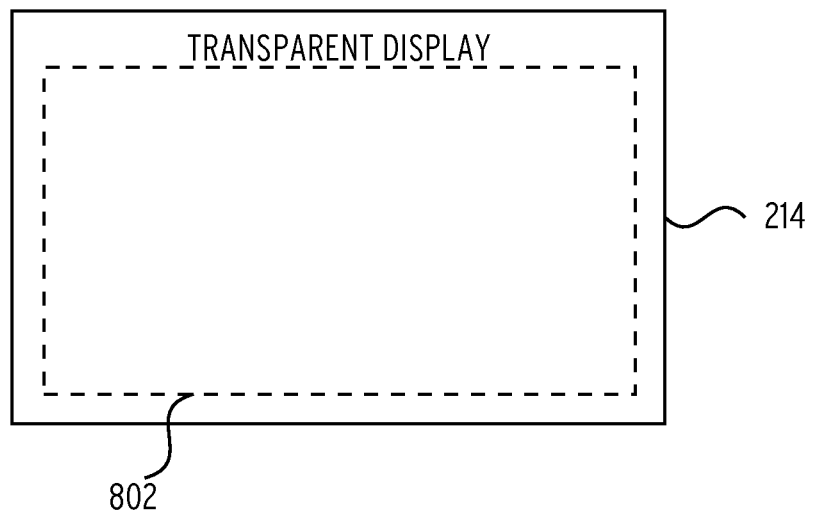
FIG. 8 is a diagram illustrating an example embodiment of a static alignment indicator in a transparent display.

FIG. 8 is a diagram illustrating an example embodiment of a static alignment indicator in a transparent display. The static alignment indicator includes a perimeter indicator 802 displayed around the edges of the transparent display 214. The perimeter indicator 802 may include, for example, a line or an illuminated virtual frame.

Figure 9:
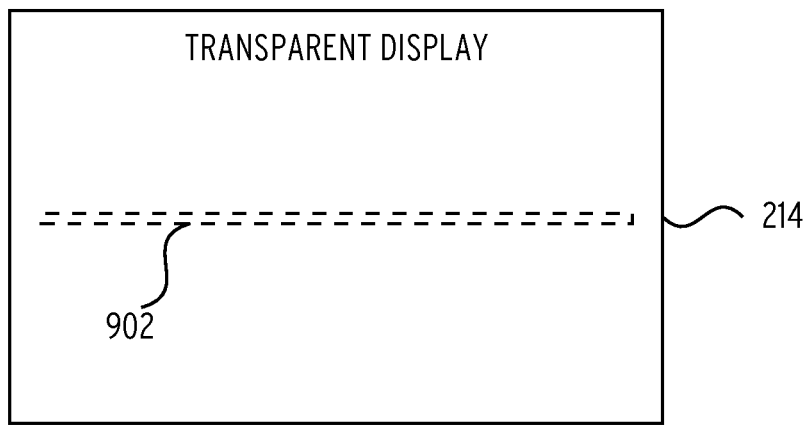
FIG. 9 is a diagram illustrating another example embodiment of a static alignment indicator in a transparent display.

FIG. 9 is a diagram illustrating another example embodiment of a static alignment indicator in a transparent display. The static alignment indicator includes a static virtual line 902 displayed in the transparent display 214. The static virtual line 902 may be displayed in the center of the transparent display 214.

Figure 10:
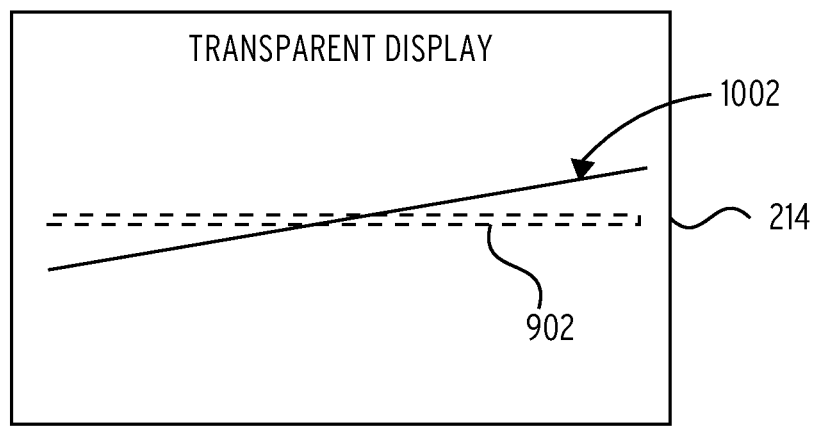
FIG. 10 is a diagram illustrating another example embodiment of a dynamic alignment indicator in a transparent display.

FIG. 10 is a diagram illustrating another example embodiment of a dynamic alignment indicator in a transparent display. The dynamic alignment indicator includes a virtual horizon indicator 1002 intersecting with a static virtual line 902 in the transparent display 214. In this example, the transparent display 214 is tilted too much to the right and the user 104 would need to manually adjust and rotate the head-mounted device 102 to the left.

Figure 11:
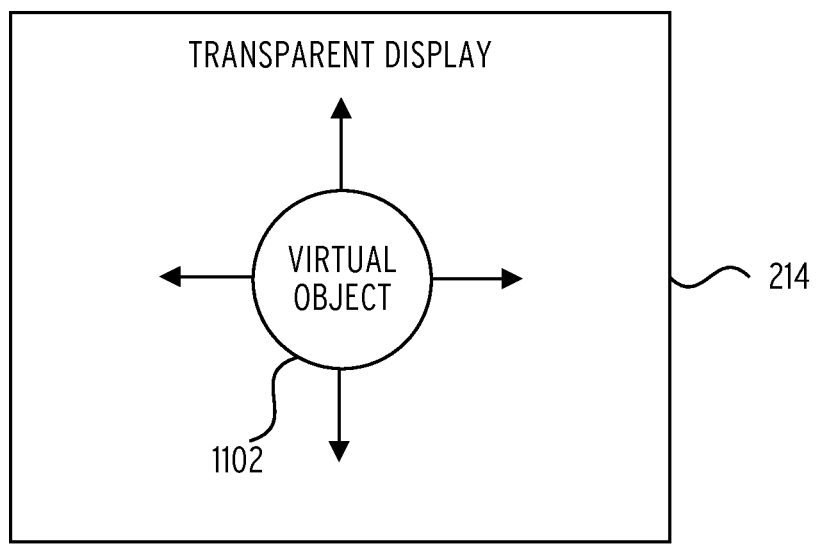
FIG. 11 is a diagram illustrating another example embodiment of another dynamic alignment indicator in a transparent display.

FIG. 11 is a diagram illustrating another example embodiment of another dynamic alignment indicator in a transparent display. A virtual object 1102 may be displayed in the transparent display 214 to guide the user 104 in aligning the head-mounted device 102. The virtual object 1102 may include for example a virtual character that points in the direction to adjust the head-mounted device 102. In another example, the location of the virtual object 1102 inside the transparent display 214 depends on the relative position between the head or eyes of the user 104 and the transparent display 214. The virtual object 1102 can thus move up or down, left or right, according to the relative position of the head of the user 104.

Figure 12:
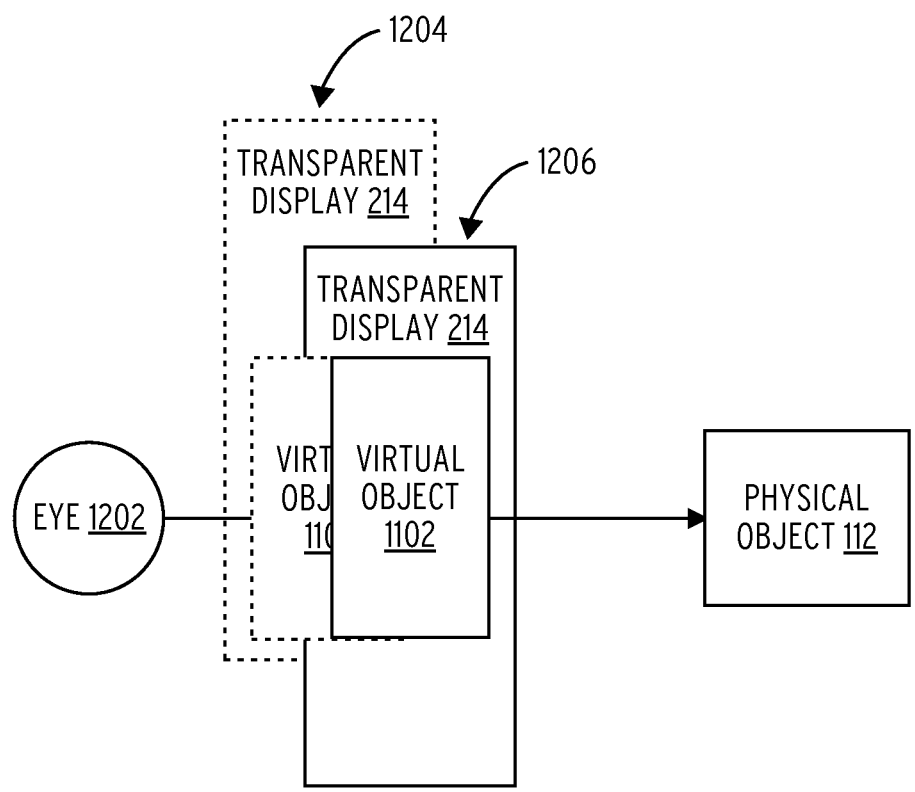
FIG. 12 is a block diagram illustrating another example embodiment of a dynamic alignment indicator in a transparent display.

FIG. 12 is a diagram illustrating another example embodiment of a dynamic alignment indicator in a transparent display.

An eye 1202 of the user 104 may look at a physical object 112 through the transparent display 214. The virtual object 1102 is generated based on the line of sight between the eye 1202 and the physical object 112. The virtual object 1102 may be associated with the physical object 112. In position 1204, the transparent display 214 displays the virtual object 1102 towards the bottom of the transparent display 214 because the transparent display 214 is positioned high relative to the eye 1202 of the user 104. In position 1206, the virtual object 1102 is displayed towards the center of the transparent display 214 and thus the transparent display 214 is properly aligned.

Figure 13:
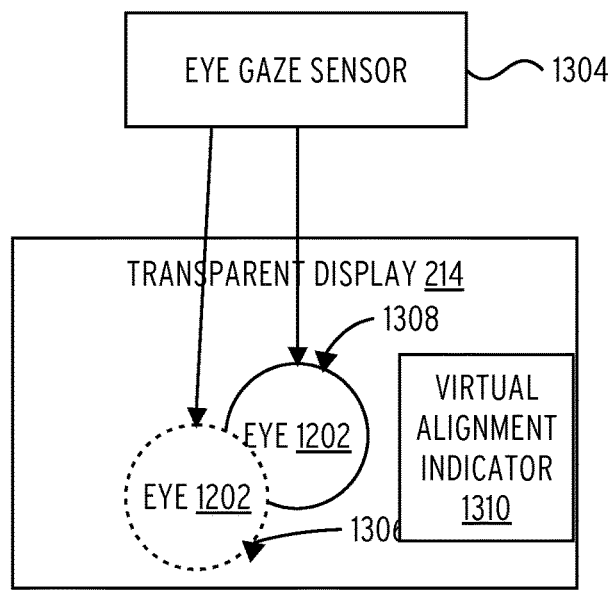
FIG. 13 is a diagram illustrating an example embodiment of a dynamic alignment indicator in a transparent display using an eye gaze sensor.

FIG. 13 is a diagram illustrating an example embodiment of a dynamic alignment indicator in a transparent display using an eye gaze sensor.

An eye gaze sensor 1304 may determine a position of the eye 1202 of the user 104 relative to the transparent display 214. For example, in position 1306, the eye gaze sensor 1304 determines that the eye 1202 is located towards the bottom left of the transparent display 214. A virtual alignment indicator 1310 guides and instructs the user 104 to adjust the transparent display 214 by shifting the transparent display 214 to the left and lowering the transparent display 214 relative to the eye 1202 of the user 104. The virtual alignment indicator 1310 may include virtual arrows or content to guide the user 104 into a corresponding direction and amount of the adjustment.

Figure 14:
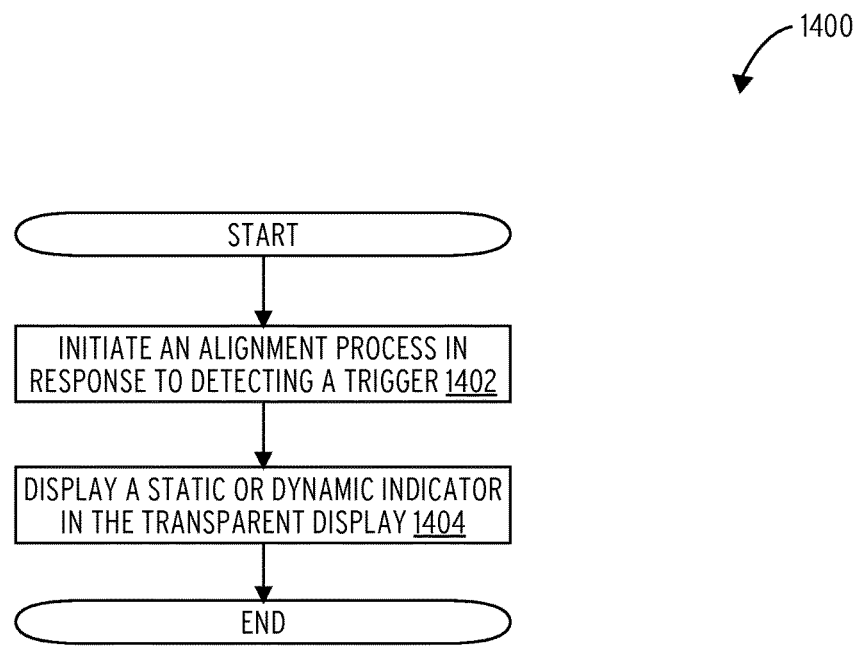
FIG. 14 is a flowchart illustrating an example operation of displaying a visual indicator for alignment in a transparent display of a head-mounted device.

FIG. 14 is a flowchart illustrating an example operation 1400 of displaying a visual indicator for alignment in a transparent display of a head-mounted device.

At block 1402, the head-mounted device 102 initiates an alignment process in response to detecting a trigger. In one example embodiment, block 1402 may be implemented using the alignment trigger module 302.

At block 1404, the head-mounted device 102 displays a static or dynamic indicator in the transparent display 214 as an alignment guide.

Figure 15:
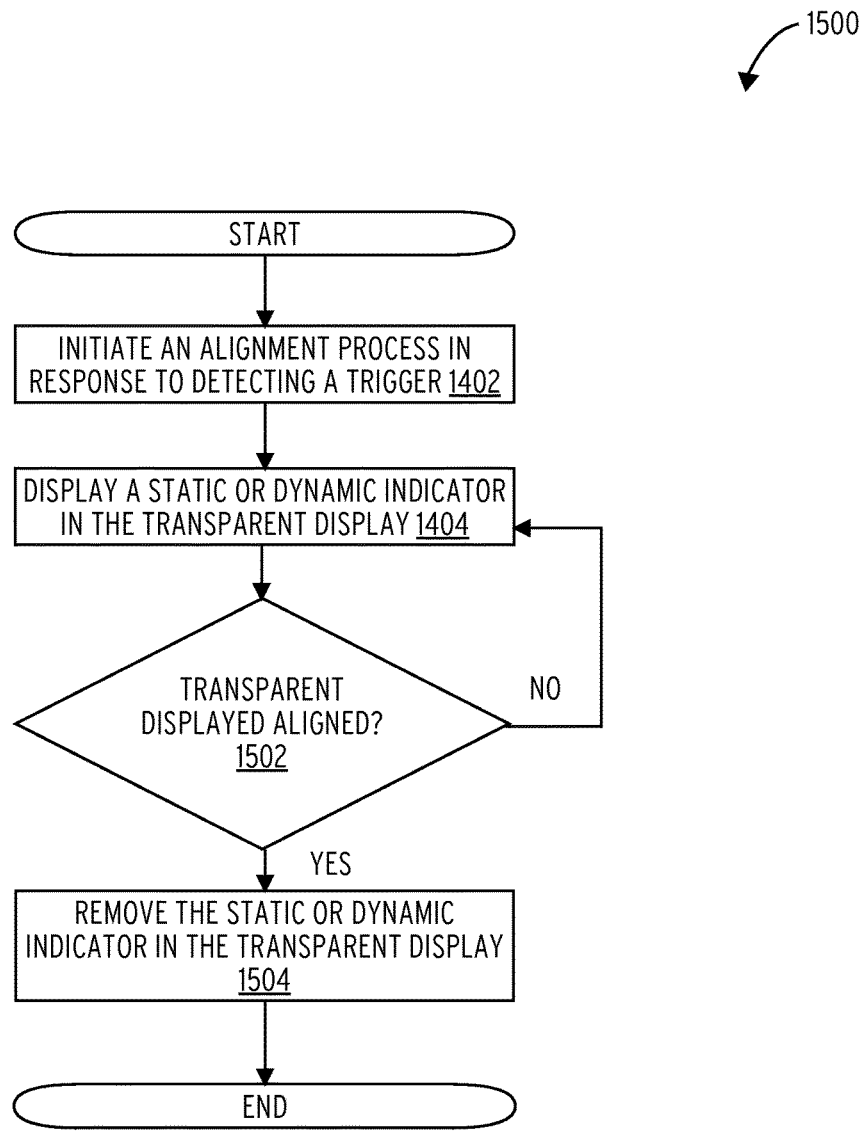
FIG. 15 is a flowchart illustrating another example operation of displaying a visual indicator for alignment in a transparent display of a head-mounted device.

FIG. 15 is a flowchart illustrating an example operation 1500 of using an augmented reality user interface.

At decision block 1502, the head-mounted device 102 determines whether the transparent display 214 is properly aligned by comparing the position of the eyes of the user 104 with respect to the transparent display 214. For example, the transparent display 214 is properly aligned if an eye of the user 104 is adjacent to a central area or region of the transparent display 214. In one example embodiment, block 1502 may be implemented using the alignment feedback module 308.

At block 1504, the head-mounted device 102 hides or removes the static or dynamic indicator from appearing in the transparent display 214 in response to determining that the transparent display 214 is properly aligned.

Figure 16:
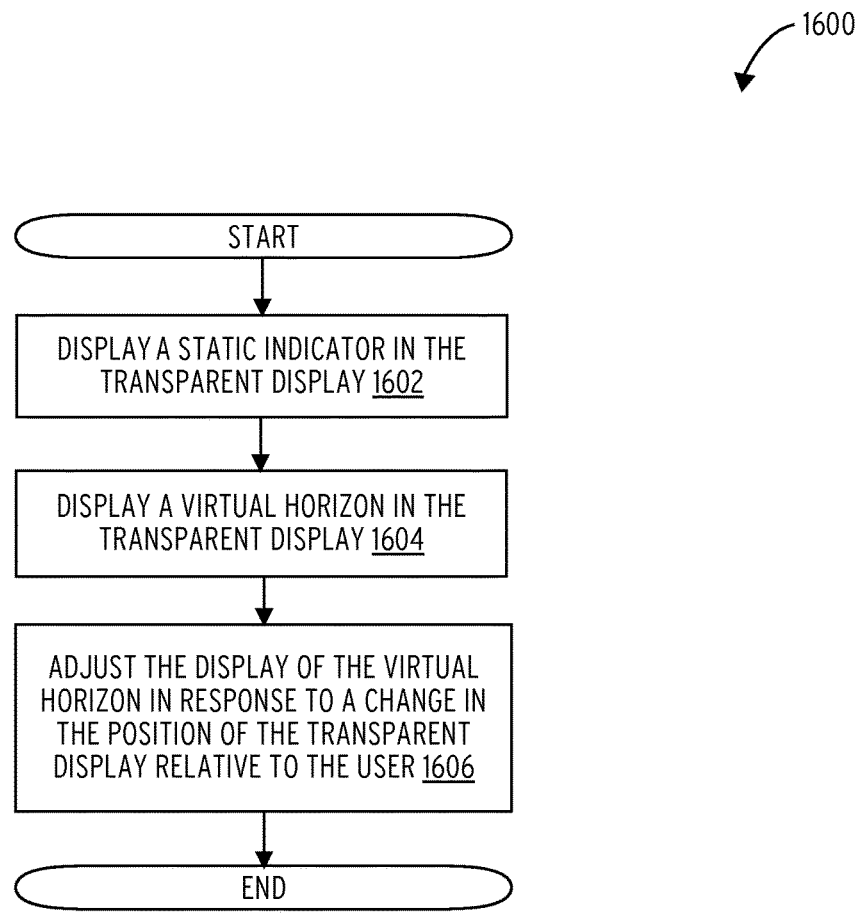
FIG. 16 is a flowchart illustrating an example operation of adjusting the display of a virtual horizon.

FIG. 16 is a flowchart illustrating an example operation 1600 of adjusting the display of a virtual horizon. At block 1602, a static indicator is displayed in the transparent display 214. The static indicator is static because its relative location within the transparent display 214 is static and does not depend on an orientation or position of the transparent display 214. In one example embodiment, block 1602 may be implemented using the static alignment indicator module 304.

At block 1604, a virtual horizon indicator 1002 is displayed in the transparent display 214. In one example embodiment, block 1604 may be implemented with the level-based indicator 602.

At block 1606, a display of the virtual horizon indicator 1002 is adjusted in response to a change in the position of the transparent display 214 and the head-mounted device 102 relative to the head or eyes of the user 104. In one example embodiment, block 1606 may be implemented with the level-based indicator 602.

Figure 17:
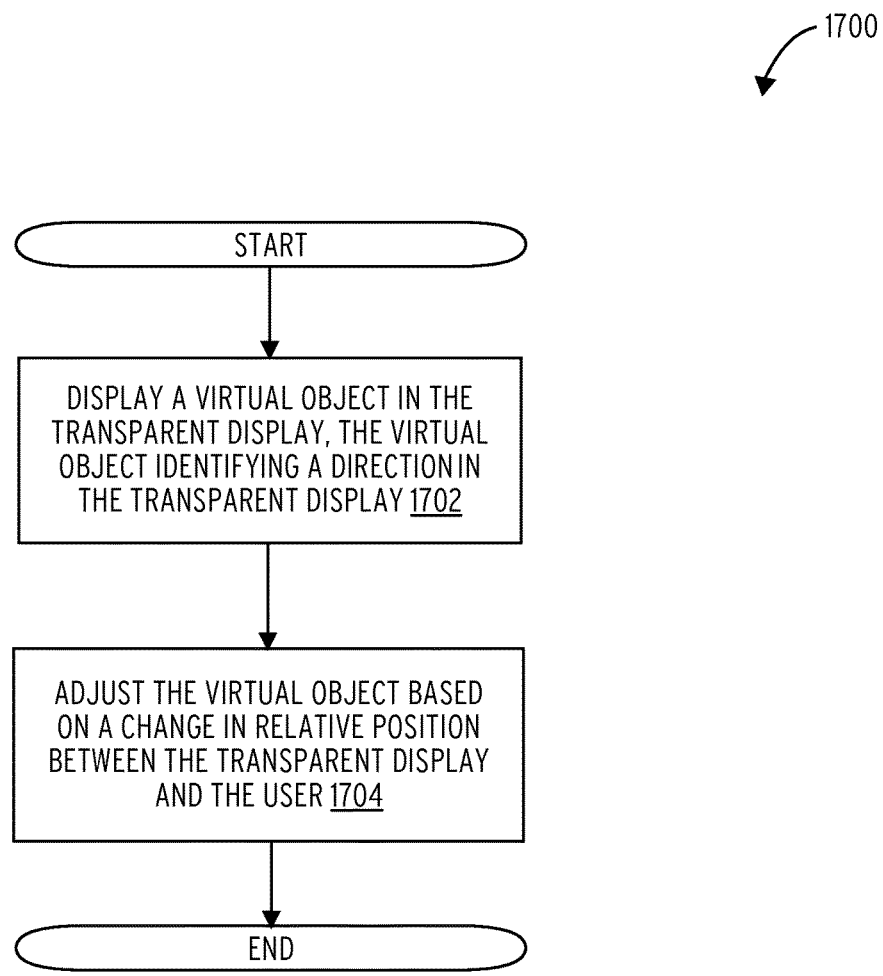
FIG. 17 is a flowchart illustrating an example operation of adjusting the display of a virtual object.

FIG. 17 is a flowchart illustrating an example operation 1700 of adjusting the display of a virtual object. At block 1702, the virtual object 1102 is displayed in the transparent display 214 in response to a trigger of the alignment process. The virtual object 1102 identifies a direction of adjustment to the user 104. Block 1702 may be implemented with the AR-based indicator 604.

At block 1704, a position or a content of the virtual object 1102 is adjusted based on a change in the relative position between the transparent display 214 and the user 104. In one example embodiment, block 1704 may be implemented with the dynamic alignment indicator module 306.

Figure 18:
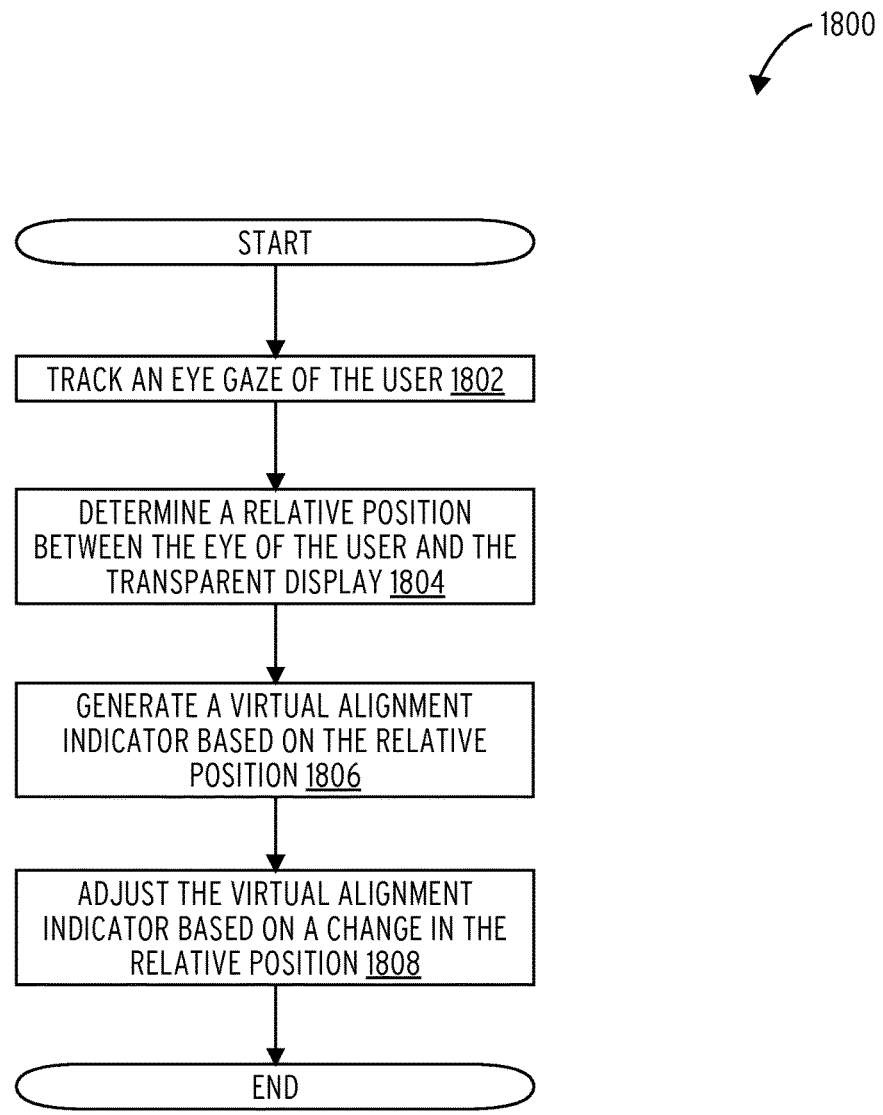
FIG. 18 is a flowchart illustrating an example operation of adjusting the display of a virtual object based on eye gaze tracking.

FIG. 18 is a flowchart illustrating an example operation 1800 of adjusting the display of a virtual object based on eye gaze tracking. At block 1802, the head-mounted device 102 tracks an eye gaze of the user 104 using the eye gaze sensor 1304. At block 1804, the head-mounted device 102 determines a relative position between the eye of the user 104 and the transparent display 214. At block 1806, the head-mounted device 102 generates the virtual alignment indicator 1310 based on a change in the relative position. In one example embodiment, block 1806 may be implemented using the eye gaze-based indicator 606. At block 1808, the head-mounted device 102 adjusts the virtual alignment indicator 1310 based on the change in the relative position.

Figure 19:
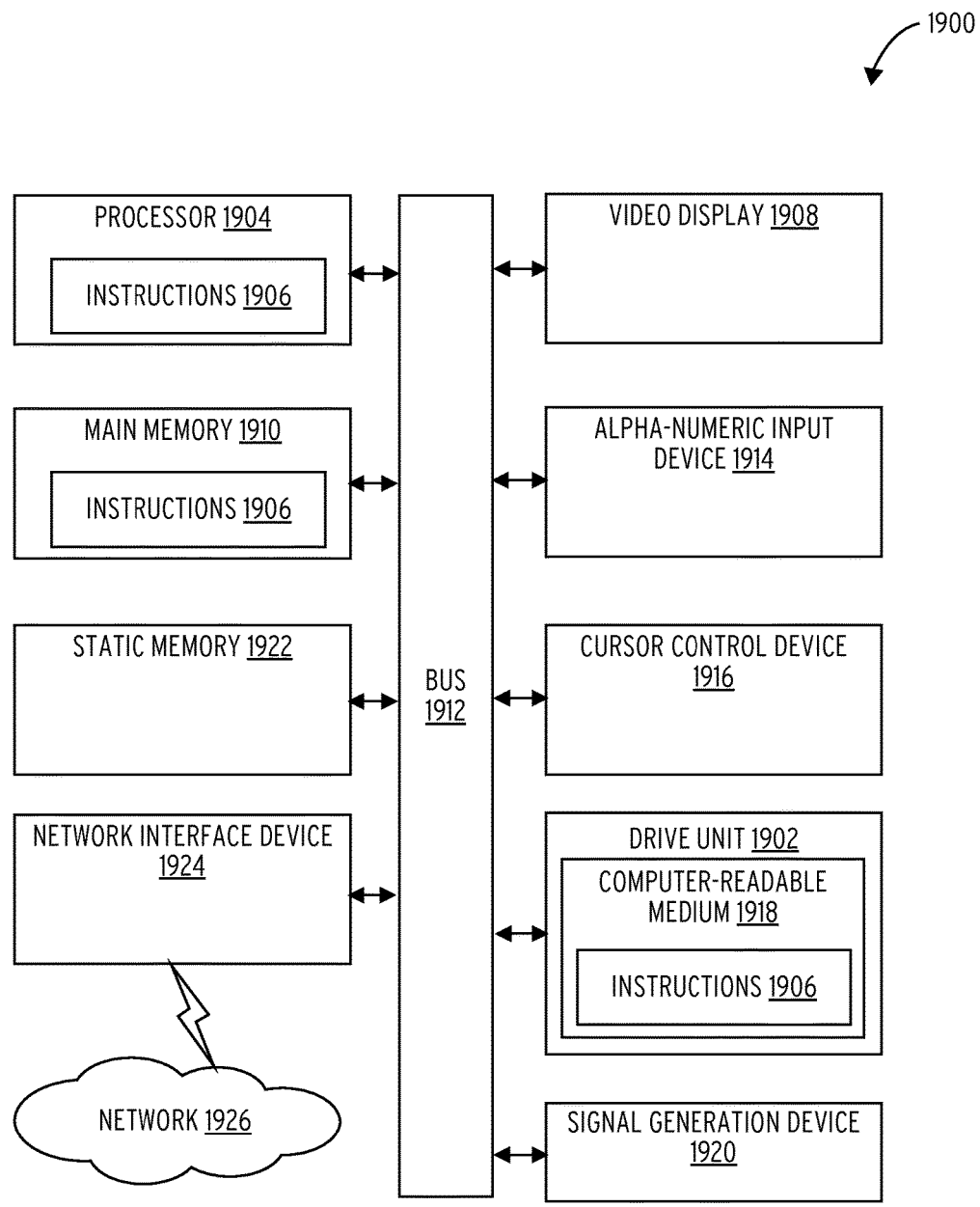
FIG. 19 is a block diagram illustrating components of a machine, according to some example embodiments, able to read instructions from a machine-readable medium and perform any one or more of the methodologies discussed herein.

FIG. 19 is a block diagram illustrating components of a machine 1900, according to some example embodiments, able to read instructions 1906 from a computer-readable medium 1918 (e.g., a non-transitory machine-readable medium, a machine-readable storage medium, a computer-readable storage medium, or any suitable combination thereof) and perform any one or more of the methodologies discussed herein, in whole or in part. Specifically, the machine 1900 is in the example form of a computer system (e.g., a computer) within which the instructions 1906 (e.g., software, a program, an application, an applet, an app, or other executable code) for causing the machine 1900 to perform any one or more of the methodologies discussed herein may be executed, in whole or in part.

In alternative embodiments, the machine 1900 operates as a standalone device or may be communicatively coupled (e.g., networked) to other machines. In a networked deployment, the machine 1900 may operate in the capacity of a server machine or a client machine in a server-client network environment, or as a peer machine in a distributed (e.g., peer-to-peer) network environment. The machine 1900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1906, sequentially or otherwise, that specify actions to be taken by that machine. Further, while only a single machine is illustrated, the term "machine" shall also be taken to include any collection of machines that individually or jointly execute the instructions 1906 to perform all or part of any one or more of the methodologies discussed herein.

The machine 1900 includes a processor 1904 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1910, and a static memory 1922, which are configured to communicate with each other via a bus 1912. The processor 1904 contains solid-state digital microcircuits (e.g., electronic, optical, or both) that are configurable, temporarily or permanently, by some or all of the instructions 1906 such that the processor 1904 is configurable to perform any one or more of the methodologies described herein, in whole or in part. For example, a set of one or more microcircuits of the processor 1904 may be configurable to execute one or more modules (e.g., software modules) described herein. In some example embodiments, the processor 1904 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1900 with at least the processor 1904, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1900 may further include a video display 1908 (e.g., a plasma display panel (PDP), a light emitting diode (LED) display, a liquid crystal display (LCD), a projector, a cathode ray tube (CRT), or any other display capable of displaying graphics or video). The machine 1900 may also include an alpha-numeric input device 1914 (e.g., a keyboard or keypad), a cursor control device 1916 (e.g., a mouse, a touchpad, a trackball, a joystick, a motion sensor, an eye tracking device, or other pointing instrument), a drive unit 1902, a signal generation device 1920 (e.g., a sound card, an amplifier, a speaker, a headphone jack, or any suitable combination thereof), and a network interface device 1924.

The drive unit 1902 (e.g., a data storage device) includes the computer-readable medium 1918 (e.g., a tangible and non-transitory machine-readable storage medium) on which are stored the instructions 1906 embodying any one or more of the methodologies or functions described herein. The instructions 1906 may also reside, completely or at least partially, within the main memory 1910, within the processor 1904 (e.g., within the processor's cache memory), or both, before or during execution thereof by the machine 1900. Accordingly, the main memory 1910 and the processor 1904 may be considered machine-readable media (e.g., tangible and non-transitory machine-readable media). The instructions 1906 may be transmitted or received over a computer network via the network interface device 1924. For example, the network interface device 1924 may communicate the instructions 1906 using any one or more transfer protocols (e.g., hypertext transfer protocol (HTTP)).

In some example embodiments, the machine 1900 may be a portable computing device (e.g., a smart phone, tablet computer, or a wearable device), and have one or more additional input components (e.g., sensors or gauges). Examples of such input components include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heart rate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the computer-readable medium 1918 is shown in an example embodiment to be a single medium, the term "machine-readable medium" should be taken to include a single medium or multiple media (e.g., a centralized or distributed database, or associated caches and servers) able to store instructions 1906. The term "machine-readable medium" shall also be taken to include any medium, or combination of multiple media, that is capable of storing the instructions 1906 for execution by the machine 1900, such that the instructions 1906, when executed by one or more processors of the machine 1900 (e.g., processor 1904), cause the machine 1900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1906 for execution by the machine 1900 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1906).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following embodiments describe various example embodiments of methods, machine-readable media, and systems (e.g., machines, devices, or other apparatus) discussed herein.

In some embodiments, a head-mounted device (HMD) may include a sensor, a transparent display, and/or a processor.

In some embodiments, the processor may include an augmented reality application and an alignment module, the augmented reality application configured to generate a virtual content based on data from the sensor, and to display the virtual content in the transparent display.

In some embodiments, the alignment module is configured to detect an initialization of the augmented reality application and to cause a temporary display of an alignment indicator in the transparent display in response to detecting the initialization of the augmented reality application.

In some embodiments, the alignment indicator may include a static alignment indicator.

In some embodiments, the alignment indicator may include at least one of an outline of a perimeter of the transparent display and a horizontal line.

In some embodiments, the alignment indicator may include a dynamic alignment indicator that is based on a relative position between the transparent display and an eye of a user wearing the HMD detected by the sensor, the alignment module configured to adjust the dynamic alignment indicator in response to a change in the relative position between the transparent display and the eye of the user wearing the HMD.

In some embodiments, the dynamic alignment indicator may include a level-based indicator.

In some embodiments, the dynamic alignment indicator may include a virtual horizon and a static horizontal line, the virtual horizon based on the sensor, the static horizontal line identifying a horizontal line centered in the transparent display.

In some embodiments, the dynamic alignment indicator may include an augmented reality-based indicator based on the relative position between the transparent display and the eye of the user wearing the HMD detected by the sensor, the augmented reality-based indicator identifying a direction for the user to adjust the transparent display.

In some embodiments, the dynamic alignment indicator may include an augmented reality-based indicator based on the relative position between the eye of the user and a physical object, the augmented reality-based indicator displayed in the transparent display in a line of sight between the eye of the user and the physical object, the augmented reality-based indicator configured to match a shape of a target area located in a central region of the transparent display.

In some embodiments, the dynamic alignment indicator may include an eye gaze-based indicator based on an eye gaze of the user and the relative position between the transparent display and the eye gaze of the user, the augmented reality-based indicator identifying a direction for the user to adjust the transparent display.

In some embodiments, the alignment module is configured to detect that a relative position between the transparent display and an eye of the user is within a threshold position, and to remove the temporary display of the alignment indicator in the transparent display in response to detecting that the relative position between the transparent display and the eye of the user is within the threshold position.

In some embodiments, the sensor may include an inertial measurement unit and an eye gaze tracking sensor.

In some embodiments, the threshold position may include a central region in the transparent display.

In some embodiments, the alignment module is configured to detect the head-mounted device that is put on a head of the user.

What is claimed is:

1. A head-mounted device (HMD) comprising:
   a sensor;
   a transparent display; and
   a processor comprising an augmented reality application and an alignment module, the augmented reality application configured to generate a virtual content based on data from the sensor, and to display the virtual content in the transparent display, the alignment module configured to detect an initialization of the augmented reality application and to cause a temporary display of an alignment indicator in the transparent display in response to detecting the initialization of the augmented reality application, the alignment indicator identifying a relative position between the HMD and a head of a user of the HMD,
   wherein the alignment indicator comprises an augmented reality-based indicator that is based on a relative position between the transparent display and an eye of the user wearing the HMD as detected by the sensor, the alignment module configured to adjust the augmented reality-based indicator in response to a change in the relative position between the transparent display and the eye of the user wearing the HMD,
   wherein the augmented reality-based indicator indicates a direction for the user to adjust the transparent display relative to the head of the user of the HMD.

2. The HMD of claim 1, wherein the alignment indicator comprises a static alignment indicator that comprises at least one of an outline of a perimeter of the transparent display and a horizontal line.

3. The HMD of claim 1, wherein the dynamic alignment indicator comprises a level-based indicator comprising a virtual horizon and a static horizontal line, the virtual horizon based on the sensor, the static horizontal line identifying a horizontal line centered in the transparent display.

4. The HMD of claim 1, wherein the augmented reality-based indicator is displayed in the transparent display in a line of sight between the eye of the user and the physical object, the augmented reality-based indicator configured to match a shape of a target area located in a central region of the transparent display.

5. The HMD of claim 1, wherein the dynamic alignment indicator comprises an eye gaze-based indicator based on an eye gaze of the user and the relative position between the transparent display and the eye gaze of the user, the augmented reality-based indicator identifying the direction for the user to adjust the transparent display relative to the head of the user of the HMD.

6. The HMD of claim 1, wherein the alignment module is configured to detect that a relative position between the transparent display and an eye of the user is within a threshold position, and to remove the temporary display of the alignment indicator in the transparent display in response to detecting that the relative position between the transparent display and the eye of the user is within the threshold position.

7. The HMD of claim 6, wherein the sensor comprises an inertial measurement unit and an eye gaze tracking sensor, the threshold position comprising a central region in the transparent display.

8. The HMD of claim 1, wherein the alignment module is configured to detect the head-mounted device being put on a head of the user.

9. A computer-implemented method comprising:
   detecting an initialization of an augmented reality application of a head-mounted device (HMD);
   causing a temporary display of an alignment indicator in a transparent display in response to detecting the initialization of the augmented reality application, the alignment indicator identifying a relative position between the HMD and a head of a user of the HMD;
   measuring a relative position between the transparent display and an eye of the user wearing the HMD as detected by the sensor, the alignment indicator comprising an augmented reality-based indicator that is based on the relative position; and
   adjusting the augmented reality-based indicator in response to a change in the relative position between the transparent display and the eye of the user wearing the HMD, the augmented reality-based indicator indicates a direction for the user to adjust the transparent display relative to the head of the user of the HMD.

10. The computer-implemented method of claim 9, wherein the alignment indicator comprises a static alignment indicator that comprises at least one of an outline of a perimeter of the transparent display and a horizontal line.

11. The computer-implemented method of claim 9, further comprising:
    generating a virtual horizon based on a sensor in the head-mounted device;
    generating a static horizontal line identifying a horizontal line centered in the transparent display; and
    causing a display of a level-based indicator comprising the virtual horizon and a static horizontal line.

12. The computer-implemented method of claim 9, further comprising:
    forming an augmented reality-based indicator to match a shape of a target area located in a central region of the transparent display; and
    causing a display of the augmented reality-based indicator based on the relative position between the eye of the user and a physical object, the augmented reality-based indicator displayed in the transparent display in a line of sight between the eye of the user and the physical object.

13. The computer-implemented method of claim 9, further comprising:
    generating an eye gaze-based indicator based an eye gaze of the user and the relative position between the transparent display and the eye gaze of the user, the augmented reality-based indicator identifying the direction for the user to adjust the transparent display relative to the head of the user of the HMD.

14. The computer-implemented method of claim 9, further comprising:
    detecting that a relative position between the transparent display and an eye of the user is within a threshold position; and
    removing the temporary display of the alignment indicator in the transparent display in response to detecting that the relative position between the transparent display and the eye of the user is within the threshold position.

15. The computer-implemented method of claim 14, further comprising:
    measuring a relative position and orientation of the head mounted device with an inertial measurement unit;
    measuring a position of the eye of the user and the eye gaze of the user using an eye gaze tracking sensor in the head mounted device; and
    generating the threshold position to include a central region in the transparent display.

16. A non-transitory computer-readable storage medium, the computer-readable storage medium including instructions that when executed by a computer, cause the computer to:
    detect an initialization of the augmented reality application of a head mounted device;
    cause a temporary display of an alignment indicator in the transparent display in response to detecting the initialization of the augmented reality application, the alignment indicator identifying a relative position between the HMD and a head of a user of the HMD;
    measure a relative position between the transparent display and an eye of the user wearing the HMD as detected by the sensor, the alignment indicator comprising an augmented reality-based indicator that is based on the relative position; and
    adjust the augmented reality-based indicator in response to a change in the relative position between the transparent display and the eye of the user wearing the HMD, the augmented reality-based indicator indicates a direction for the user to adjust the transparent display relative to the head of the user of the HMD.

* * * * *

UNITED STATES PATENT AND TRADEMARK OFFICE
CERTIFICATE OF CORRECTION

Page 1 of 1

PATENT NO. : 9,599,825 B1
APPLICATION NO. : 14/870871
DATED : March 21, 2017
INVENTOR(S) : Mullins et al.

It is certified that error appears in the above-identified patent and that said Letters Patent is hereby corrected as shown below:

On the Title Page

In item (22), in "Filed", in Column 1, Line 1, after "Sep. 30, 2015", insert:
--¶(65) Prior Publication Data
US 2017/0090203 A1 Mar. 30, 2017--

Signed and Sealed this
Fifth Day of May, 2020

Andrei Iancu
*Director of the United States Patent and Trademark Office*